(12) United States Patent
Cheng et al.

(10) Patent No.: US 8,488,572 B2
(45) Date of Patent: Jul. 16, 2013

(54) METHODS AND SYSTEMS FOR MULTI-MODE SIGNAL QUALITY REPORTING

(75) Inventors: Steven Cheng, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 877 days.

(21) Appl. No.: 12/211,863

(22) Filed: Sep. 17, 2008

(65) Prior Publication Data

US 2010/0067433 A1    Mar. 18, 2010

(51) Int. Cl.
*H04W 4/00* (2009.01)

(52) U.S. Cl.
USPC ........................................ 370/338; 455/552.1

(58) Field of Classification Search
USPC ............... 370/338, 320, 342, 441; 455/552.1
See application file for complete search history.

(56) References Cited

U.S. PATENT DOCUMENTS

| | | | |
|---|---|---|---|
| 5,640,414 A | 6/1997 | Blakeney, II et al. | |
| 7,489,930 B2 | 2/2009 | Aerrabotu et al. | |
| 7,961,875 B2* | 6/2011 | Sachs et al. | 380/29 |
| 8,019,346 B2* | 9/2011 | Sachs et al. | 455/439 |
| 2002/0147008 A1* | 10/2002 | Kallio | 455/426 |
| 2006/0121935 A1* | 6/2006 | Dalsgaard et al. | 455/552.1 |
| 2006/0198347 A1* | 9/2006 | Hurtta et al. | 370/338 |
| 2008/0090520 A1* | 4/2008 | Camp et al. | 455/41.2 |
| 2011/0263274 A1* | 10/2011 | Fox et al. | 455/456.2 |

FOREIGN PATENT DOCUMENTS

| | | |
|---|---|---|
| EP | 1469637 | 10/2004 |
| JP | 2002541747 T | 12/2002 |
| JP | 2003229800 A | 8/2003 |
| JP | 2004349976 A | 12/2004 |
| JP | 2006080706 A | 3/2006 |
| JP | 2006261869 A | 9/2006 |
| JP | 2008035420 A | 2/2008 |
| WO | WO0060895 | 10/2000 |
| WO | WO2007104038 | 9/2007 |

OTHER PUBLICATIONS

International Search Report & Written Opinion—PCT/US2009/056425, International Search Authority—European Patent Office—Dec. 29, 2009.
Taiwan Search Report—TW098131285—TIPO—Aug. 3, 2012.

* cited by examiner

*Primary Examiner* — Phuc Tran
(74) *Attorney, Agent, or Firm* — Tyler J. Overall (57) ABSTRACT

Certain embodiments of the present disclosure provide a method for wireless communications by a multi-mode mobile station that supports communications with a plurality of radio access technologies (RATs). The RATs may include at least one short range RAT and at least one long range RAT. The method generally includes establishing a first connection with a first network via a short range RAT supported by the mobile station, taking signal quality measurements for one or more long range RAT supported by the mobile station, and transmitting the signal quality measurements via the first connection.

32 Claims, 8 Drawing Sheets

METHODS AND SYSTEMS FOR MULTI-MODE SIGNAL QUALITY REPORTING

TECHNICAL FIELD

Certain embodiments of the present disclosure generally relate to wireless communication and, more particularly, to communicating with mobile devices that support multiple radio access technologies.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

In order to expand the services available to subscribers, some MSs support communications with multiple radio access technologies (RATs). For example, a dual-mode MS may support WiMAX for broadband data services and code division multiple access (CDMA) for voice services.

Unfortunately, in conventional systems, inefficient switching between the two networks may cause a reduction in throughput on either service.

SUMMARY

Certain embodiments of the present disclosure provide a method for wireless communications by a multi-mode mobile station that supports communications with a plurality of radio access technologies (RATs). The RATs may include at least one short range RAT and at least one long range RAT. The method generally includes establishing a first connection with a first network via a short range RAT supported by the mobile station, taking signal quality measurements for one or more long range RATs supported by the mobile station, and transmitting the signal quality measurements via the first connection.

Certain embodiments of the present disclosure provide a method for wireless communications. The method generally includes receiving a list of multiple radio access technologies (RATs) supported by a mobile station and receiving, with a first connection established via a first one of the RATs, signal quality measurements for a second one or more of the RATs.

Certain embodiments of the present disclosure provide an apparatus for wireless communications by a multi-mode mobile station that supports communications with a plurality of radio access technologies (RATs). The RATs may include at least one short range RAT and at least one long range RAT. The apparatus generally includes logic for establishing a first connection with a first network via a short range RAT supported by the mobile station, logic for taking signal quality measurements for one or more long range RATs supported by the mobile station, and logic for transmitting the signal quality measurements via the first connection.

Certain embodiments of the present disclosure provide an apparatus for wireless communications. The apparatus generally includes logic for receiving a list of multiple radio access technologies (RATs) supported by a mobile station and logic for receiving, with a first connection established via a first one of the RATs, signal quality measurements for a second one or more of the RATs.

Certain embodiments of the present disclosure provide an apparatus for wireless communications by a multi-mode mobile station that supports communications with a plurality of radio access technologies (RATs). The RATs may include at least one short range RAT and at least one long range RAT. The apparatus generally includes means for establishing a first connection with a first network via a short range RAT supported by the mobile station, means for taking signal quality measurements for one or more long range RATs supported by the mobile station, and means for transmitting the signal quality measurements via the first connection.

Certain embodiments of the present disclosure provide an apparatus for wireless communications. The apparatus generally includes means for receiving a list of multiple radio access technologies (RATs) supported by a mobile station and means for receiving, with a first connection established via a first one of the RATs, signal quality measurements for a second one or more of the RATs.

Certain embodiments of the present disclosure provide a computer-program product for wireless communications by a multi-mode mobile station that supports communications with a plurality of radio access technologies (RATs) comprising a computer readable medium having instructions stored thereon, the instructions being executable by one or more processors. The RATs may include at least one short range RAT and at least one long range RAT. Additionally, the instructions generally include instructions for establishing a first connection with a first network via a short range RAT supported by the mobile station, instructions for taking signal quality measurements for one or more long range RAT supported by the mobile station, and instructions for transmitting the signal quality measurements via the first connection.

Certain embodiments of the present disclosure provide a computer-program product for wireless communications comprising a computer readable medium having instructions stored thereon, the instructions being executable by one or more processors. The instructions generally include instructions for receiving a list of multiple radio access technologies (RATs) supported by a mobile station and instructions for receiving, with a first connection established via a first one of the RATs, signal quality measurements for a second one or more of the RATs.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Embodiments of the present disclosure may allow a multi-mode mobile device supporting a plurality of radio access technologies (RATs) to receive a long-range RAT page request indicating traffic destined for the MS through an active Wi-Fi connection without listening to each long-range RAT's paging channel. Specifically, embodiments may provide a multi-mode MS connected to a network via an active Wi-Fi connection to receive a long-range RAT paging message from the network via the Wi-Fi connection, indicating traffic destined for the MS through a supported long-range RAT, thereby reducing the need for the MS to switch between RATs to listen for paging requests through a supported long-range RATs and possibly saving power.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Figure 1:
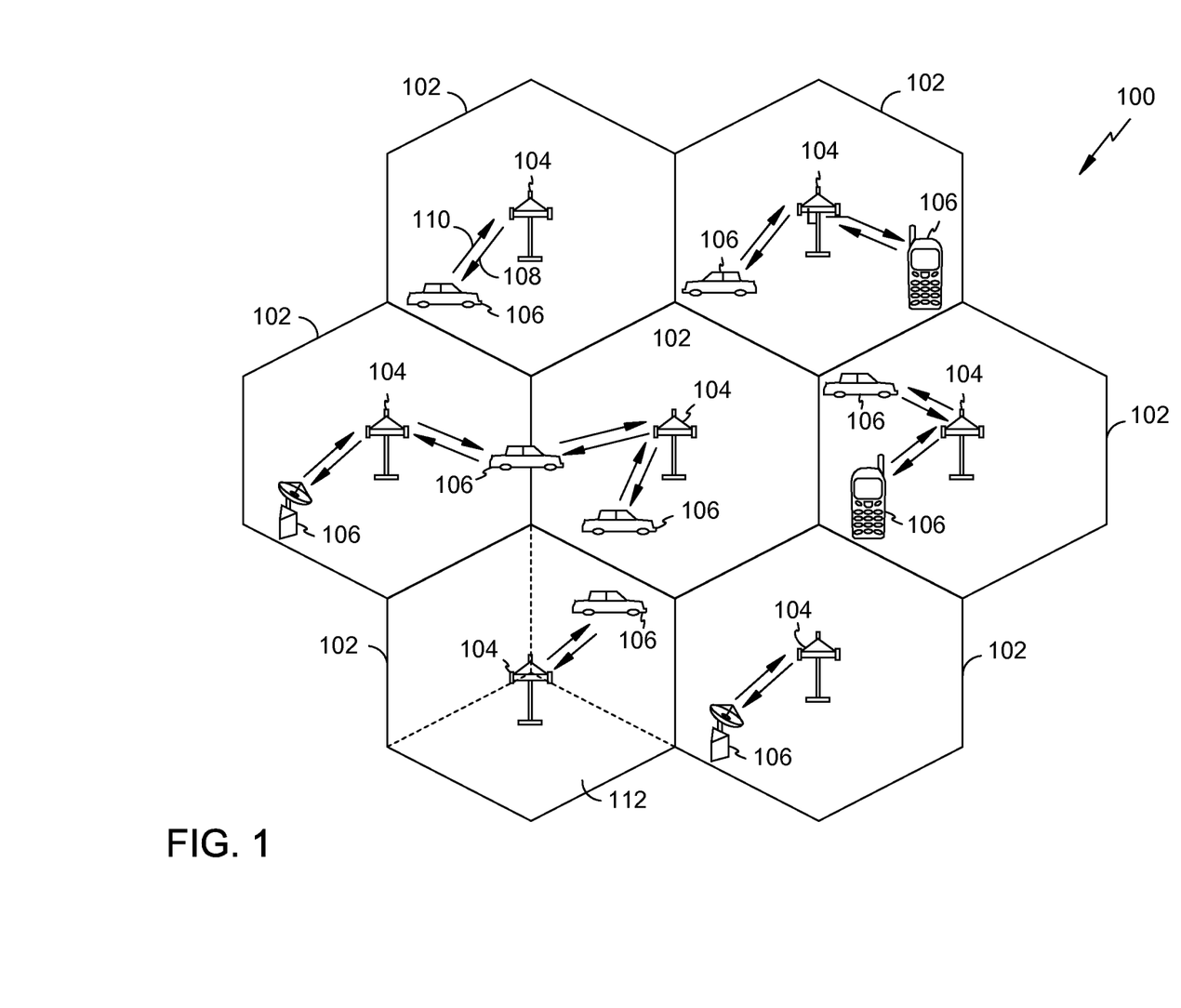
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
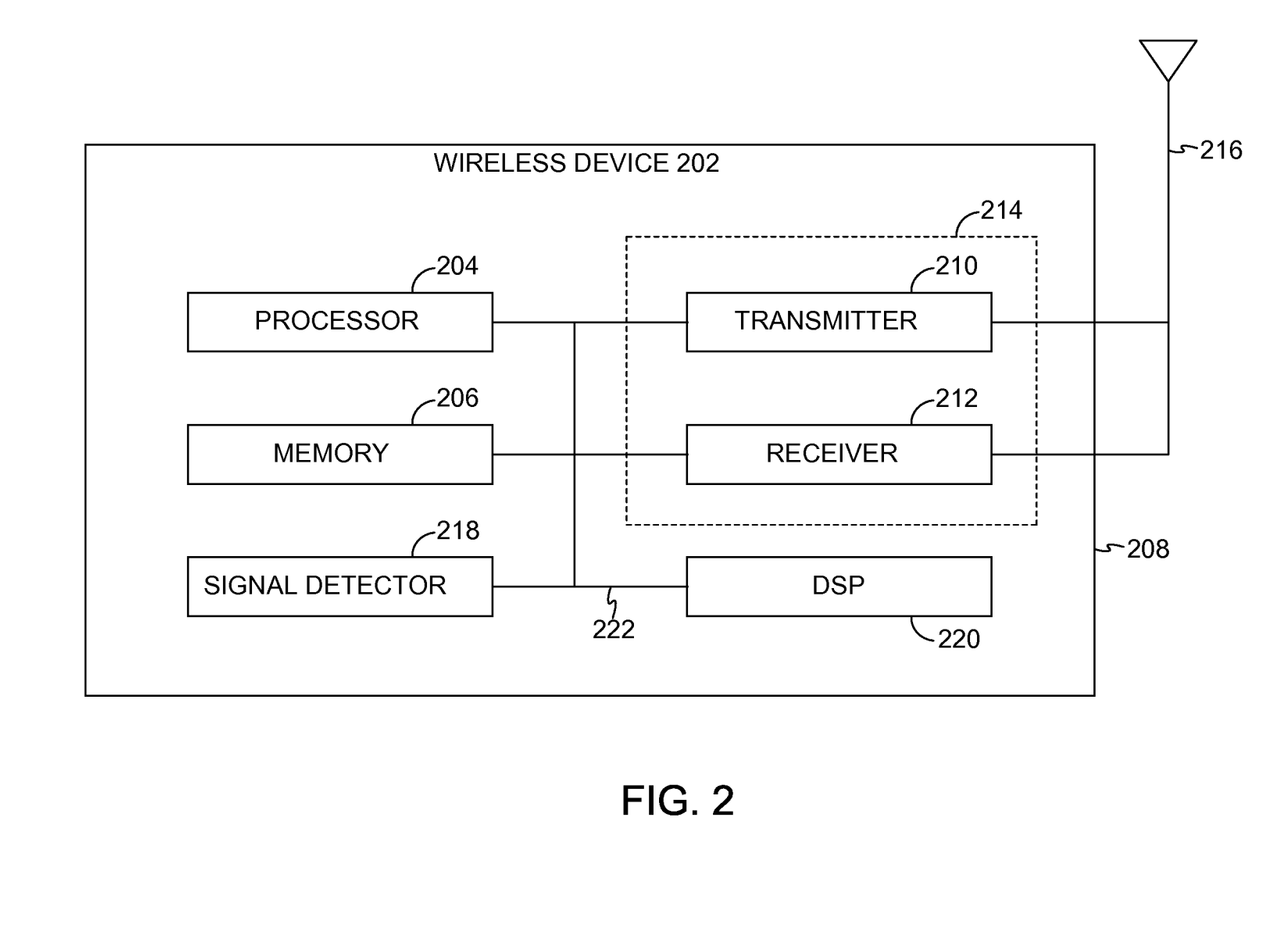
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier and per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
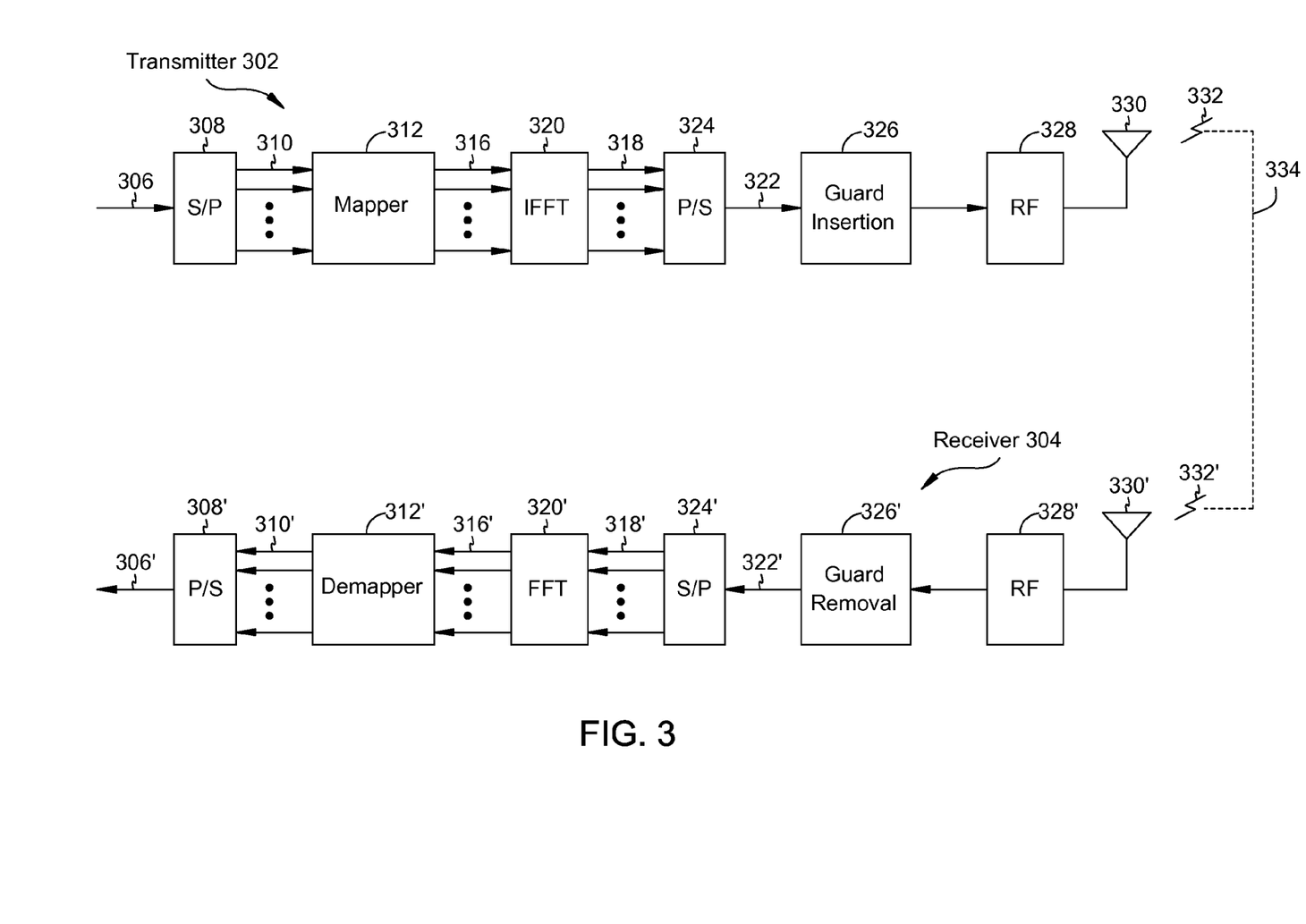
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor.

Exemplary Power Saving Multi-Mode Techniques when Wi-Fi is Active

As stated above, WiMAX wireless communication systems based on the IEEE 802.16 standard use a network of base stations mounted to service towers to communicate with wireless devices (i.e., mobile stations). Each base station (BS) emits and receives radio frequency (RF) signals that convey data to and from the mobile stations (MS) (e.g., cell phones, laptop computers, etc.). Similarly, other radio access technologies (RATs) use a network of base stations to communicate with one or more wireless devices. For example, the Universal Mobile Telecommunication System (UMTS), Global System for Mobile communications (GSM), and Ultra Mobile Broadband (UMB) technologies may all employ a plurality of BSs to receive and transmit RF signals that convey data to and from MSs. Since a single service tower may physically support a plurality of base stations for a variety of RATs, a given geographic area may be within the coverage area of more than one radio access technology Accordingly, an MS may be configured to communicate with a plurality of RATs (i.e., multi-mode mobile stations). Since an MS may only be connected with a single RAT at a time, a multi-mode MS may be idle with respect to other RATs supported by the MS. Consequently, the MS may periodically listen to the paging channels for each supported RAT based on a paging schedule corresponding to each RAT. However, switching between various RATs to listen for paging requests requires additional power which may go to waste if a paging request is not present. Further, data throughput may be reduced while the MS switches among the various RATs listening for paging requests.

Figure 4:
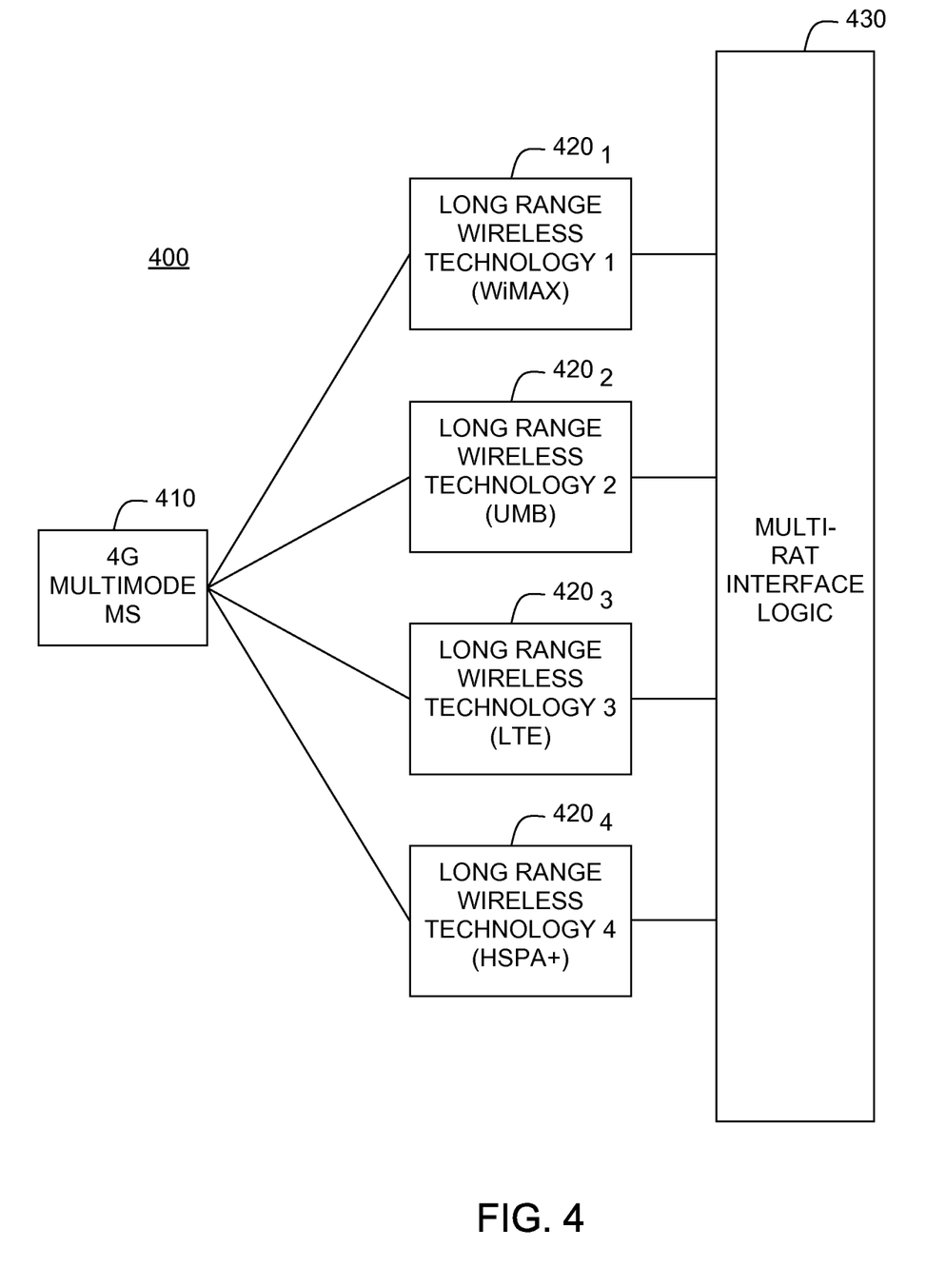
FIG. 4 illustrates an example multi-mode mobile station that may support a plurality of radio access technologies (RATs), in accordance with certain embodiments of the present disclosure.

FIG. 4 illustrates a system 400 in which a multi-mode MS 410 may operate in a geographic area that is serviced by a plurality of long-range, wireless RATs $420_{1-4}$. In the present example, the multi-mode MS 410 may access a network through a Worldwide Interoperability for Microwave Access (WiMAX) service $420_1$, an Ultra Mobile Broadband (UMB) service $420_2$, Long Term Evolution (LTE) service $420_3$, an Evolved High-Speed Packet Access (HSPA+) service $420_4$, or any other mobile voice or data protocol known by those skilled in the art.

However, since long-range RATs (e.g., WiMAX or CDMA) are designed to provide service over several kilometers, the power consumption of a multi-mode MS responding to paging requests or providing performance measurements is non-trivial. In contrast, short-range RATs (e.g., Wi-Fi) are designed to provide service over several hundred meters. Accordingly, responding to paging requests and providing performance measurements through a short-range RAT may result in less power consumption and, consequently, longer battery life. Embodiments of the present disclosure may provide multi-RAT interface logic 430 to both long-range and short-range RATs allowing information to be exchanged between the BSs of the multiple RATs. This may enable a multi-mode MS 410 to provide performance measurements to or answer paging requests from a long-range RAT through a short-range RAT.

Figure 5:
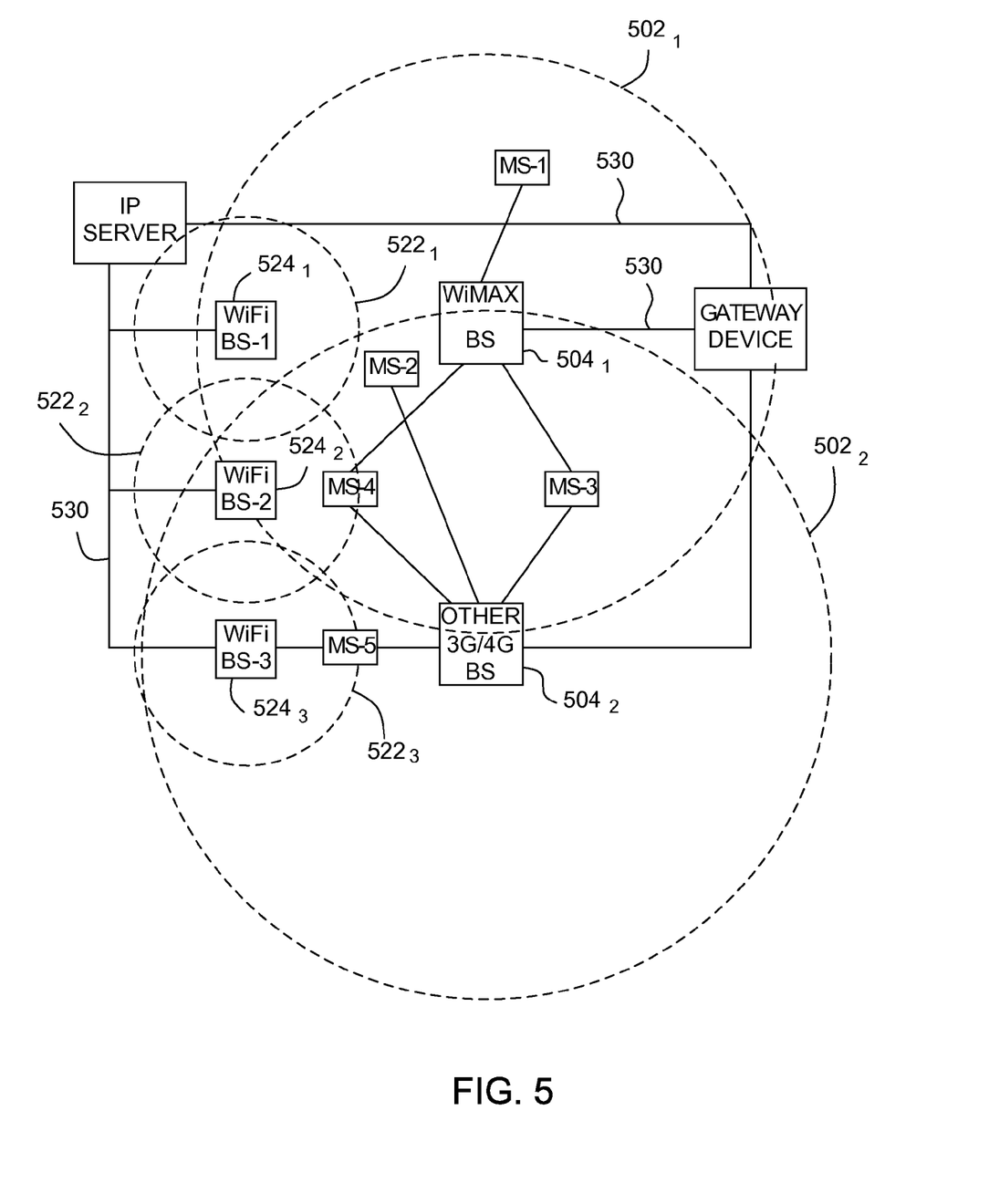
FIG. 5 illustrates an example geographic area with regions which are serviced by both long and short-range radio access technologies, in accordance with certain embodiments of the present disclosure.

FIG. 5 illustrates how a network may provide access to a given geographic area through a variety of RATs, including both short and long-range RATs. For instance, the present example illustrates how a network may provide access to a plurality of MSs through a first long-range RAT BS $504_1$ (e.g., a WiMAX BS), a second long-range RAT BS $504_2$, as well as several short-range RAT BSs $524_{1-3}$ (e.g., Wi-Fi BSs), where each BS is connected to the network through wire lines 530 (e.g., E1 lines, T1 lines, PSTN lines, and cable lines).

As a result of having a plurality of BSs, located at different points, providing access to the network through a variety of RATs, a multi-mode MS (i.e., MS-1 through MS-5) may have more than one option when connecting with the network. For example, since MS-2 and MS-3 are within the WiMAX service area $502_1$ and the second long-range RAT service area $502_2$, both MS-2 and MS-3 have the option of connecting to the network via either the WiMAX BS $504_1$ or the second long-range RAT BS $504_2$.

In instances where the multi-mode MS has more than one RAT through which it may connect to the network, the MS may need to periodically listen to each supported RAT's paging channel, perform channel measurements on each cell that is available to the MS, and transmit channel measurement reports to the corresponding BSs. Since the paging cycles of each RAT are different, the multi-mode MS may miss paging signals due to paging schedule conflicts. Further, switching between different RATs to monitor paging channels and transmit channel measurement reports may result in unnecessary power consumption.

However, there may be instances in which a multi-mode MS may be within the service area of both short-range and long-range RATs. For example, MS-4 and MS-5 are both within a Wi-Fi service area ($522_1$, $522_2$, or $522_3$) as well as the service area of one or more long-range RATs. In instances where the MS is within the service area of both a Wi-Fi BS 524 and a BS for one or more long-range RATs, it may be beneficial for a multi-mode MS to receive a unified paging message from the network through a Wi-Fi connection, regardless of the RAT through which the incoming message is traveling.

A unified paging message, in accordance with certain embodiments of the present disclosure, may be a single paging message sent from the network to the MS through a single RAT in response to the network receiving a message destined for the MS through one of the RATs supported by the MS. For example, the network may receive a message destined for the MS through a WiMAX RAT. In response, the network may send a unified paging message that has been modified to indicate, not only the presence of a message, but also the RAT through which the message is available to the MS through a Wi-Fi connection.

Implementations of embodiments of the present disclosure may result in a reduction in power consumption by the MS. Specifically, the implementation of a unified paging message bundles the paging cycles of all of the supported RATs into a single unified paging cycle for all of the RATs. Consequently, fewer paging cycles are needed. Further, the transmissions performed in long-range wireless communications require additional power when compared to the transmissions performed in short-range wireless communications. Accordingly, responding to paging requests and transmitting channel measurement reports through a Wi-Fi connection requires less transmission power than doing the same operations through long-range RATs.

Figure 6:
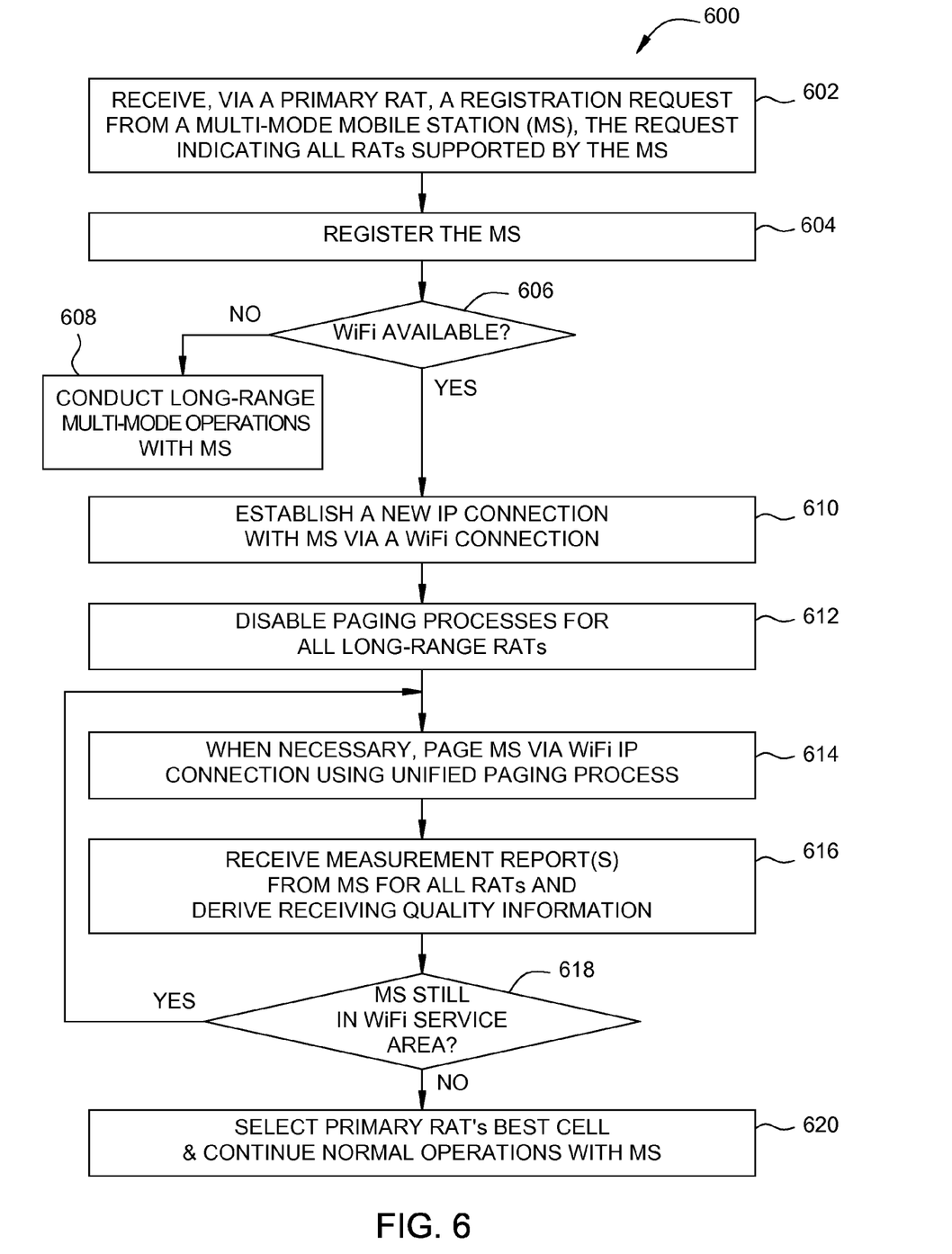
FIG. 6 illustrates example operations performed by a network providing access to multi-mode mobile stations via a plurality of supported long and short-range radio access technologies (RATs), in accordance with certain embodiments of the present disclosure.

FIG. 6 illustrates example operations 600 of a network providing access through multiple RATs to one or more multi-mode MSs and utilizing an available Wi-Fi connection to send a unified paging request to the MS. The operations may be performed by various network components, such as multi-RAT interface logic 430 shown in FIG. 4. Operations begin at 602 with the network receiving a registration request from a multi-mode MS via a first RAT.

At 604, the network may register the MS through the first RAT. During the registration process, the MS may inform the network of all the RATs supported by the MS. This may be done by amending the standard governing the specific RAT to allow additional information to be transmitted. For example, bits previously reserved under a specific governing standard may be utilized to communicate additional information (i.e., RATs supported by the multi-mode MS).

At 606, the network may verify the availability of Wi-Fi at the location of the MS, or in other words, the network may verify if the MS is within a Wi-Fi service area. If Wi-Fi is not available at the MS's location, the network may conduct long-range multi-mode operations with the MS, as illustrated at 608. However, if Wi-Fi is available at the location of the MS, the network may establish an IP connection with the multi-mode MS via a Wi-Fi connection, as illustrated at 610.

At 612, the network may disable the paging processes for all long-range RATs supported by the MS and implement a unified paging process. This may be done through hardware or software logic at the BS serving the MS for each corresponding RAT. When the network receives a message destined for the MS, the network may page the MS via the Wi-Fi IP connection using a unified paging message, as illustrated at 614.

At 616, the network may periodically receive a set of channel measurement reports from the MS for all RATs supported by the MS. The channel measurements in each channel measurement report may include a carrier to noise ratio (CNR), a carrier to interference ratio (CIR), a carrier to interference plus noise ratio (CINR), or any other channel measurement known by those skilled in the art. From the set of channel measurement reports, the network may derive receiving quality metrics for each RAT which may be used in selecting a primary RAT or a best cell within a specific RAT.

Additionally, when the MS is actively connected to the network through a Wi-Fi connection, but not actively connected to the network through the long-range RATs, the MS may further save power by performing channel measurements for the long-range RATs only when the Wi-Fi signal is below a pre-determined threshold.

Periodically, the network may evaluate whether or not the MS is still within a Wi-Fi service area, as illustrated at 618. If the MS is still within the Wi-Fi service area, the network may repeat operations 614-618. However, if the MS has moved from the Wi-Fi service area, the network may select the best cell of a MS' primary long-range RAT and continue with normal operations with the MS via said RAT, as illustrated at 620.

Figure 6A:
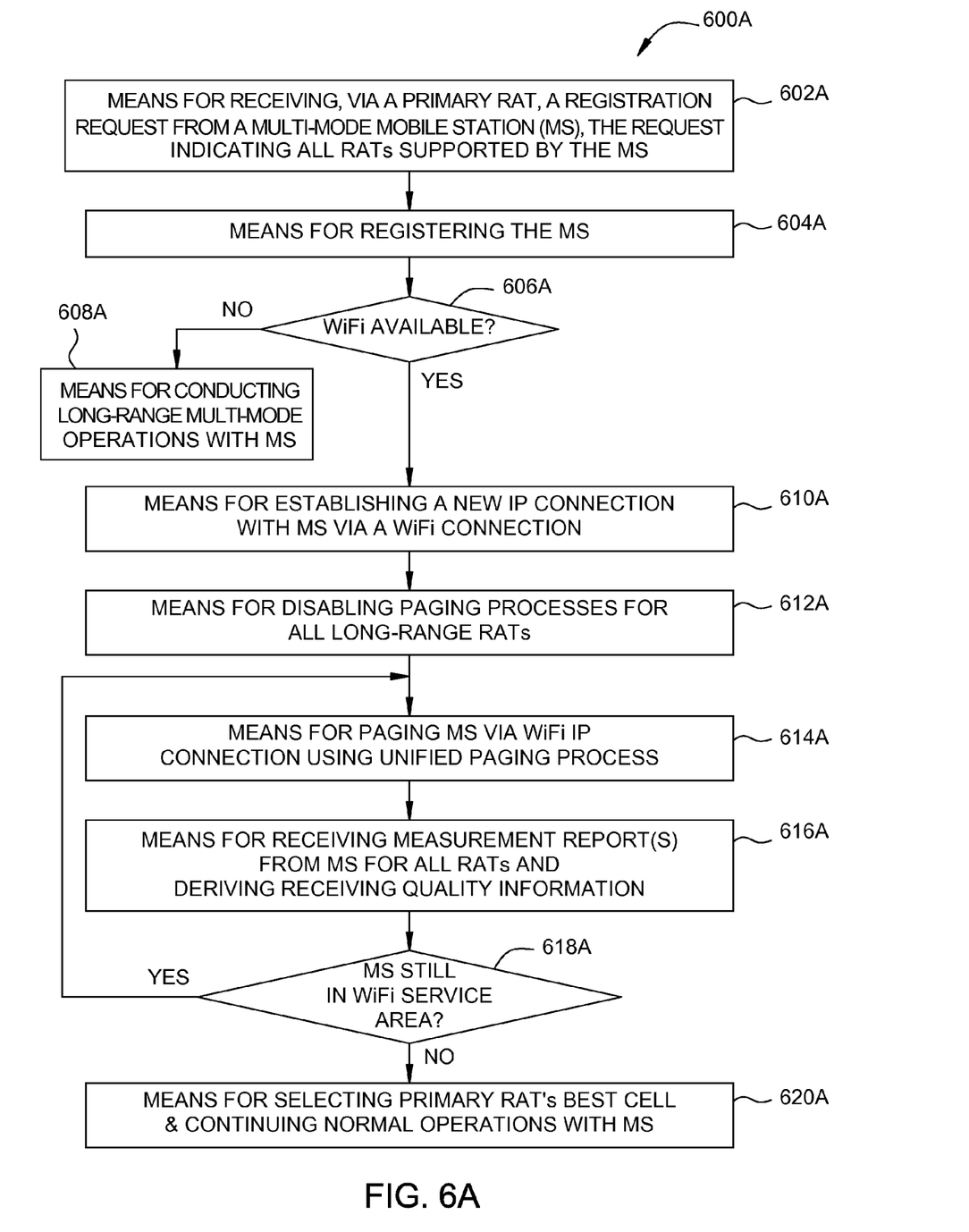
FIG. 6A is a block diagram of means corresponding to the example operations of FIG. 6 for a multi-mode mobile station serviced by a plurality of supported radio access technologies, in accordance with embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 602-620 illustrated in FIG. 6 correspond to means-plus-function blocks 602A-620A illustrated in FIG. 6A.

Figure 7A:
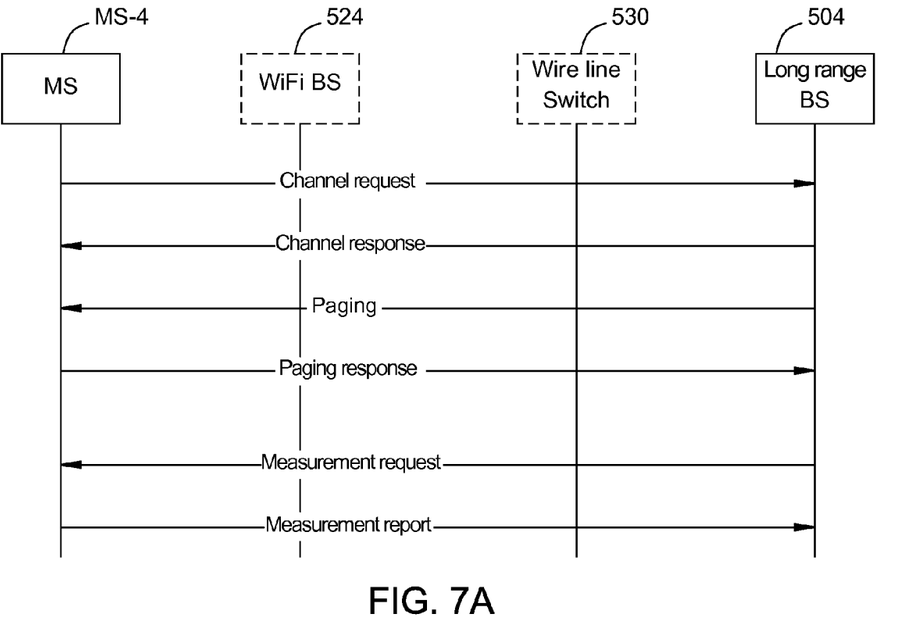
FIGS. 7A and 7B illustrate the differences in power consumption between a conventional MS/long-range RAT BS exchange and a MS/long-range RAT BS exchange in accordance with embodiments of the present disclosure.
Figure 7B:
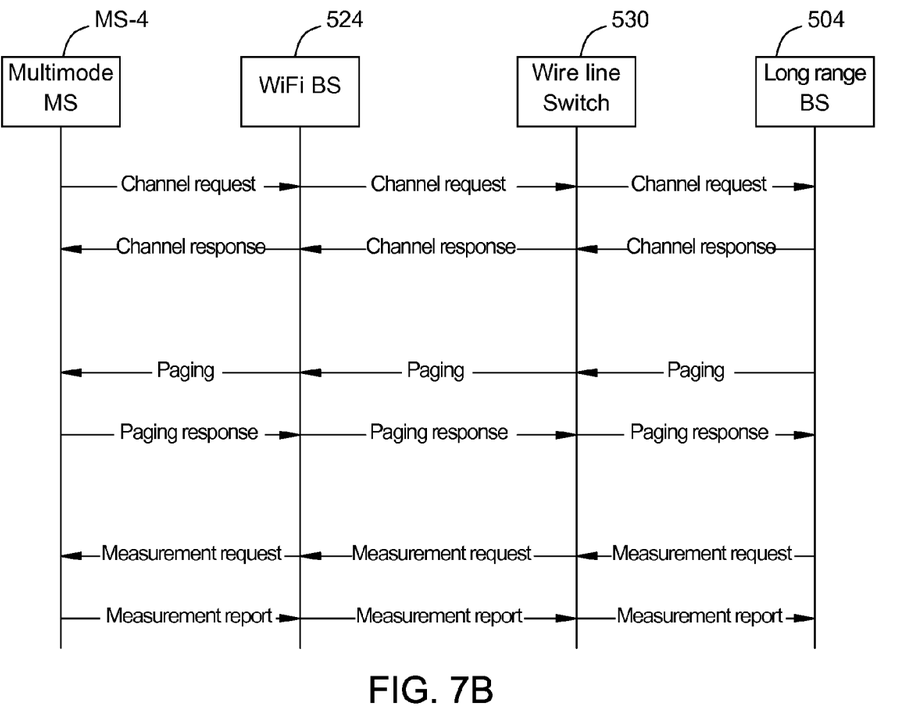

FIGS. 7A and 7B illustrate the differences in power consumption between conventional MS/long-range RAT BS communications (FIG. 7A) and MS/Wi-Fi/long-range RAT BS communications (FIG. 7B). FIG. 7A illustrates how paging communications and channel measurement exchanges between the MS and the long-range BS 504 bypasses the Wi-Fi BS 524 and the wire line 530. Each time the MS transmits to the BS, the MS must transmit the message with sufficient power for the message to travel several kilometers. The amount of power used by a MS to transmit a message several kilometers is substantial, resulting in a substantially shorter amount of time the MS may operate between charges.

In contrast, FIG. 7B illustrates how paging communications and channel measurement exchanges between the MS and the long-range BS 504 pass through the Wi-Fi BS 524 and the wire line 530. By transmitting to the long-range BS 504 through the Wi-Fi BS 524, the MS is only required to transmit the message with sufficient power for the message to travel several hundred meters. The additional power needed for the message to travel from the Wi-Fi BS 524 to the long-range BS 504 is provided by the BSs and wire lines, components in which power consumption is of much less concern.

Additionally, embodiments of the present disclosure may allow the network to receive the channel measurement reports for all of the RATs from a single MS connection. A consolidated measurement report, as described, may enable the network to better plan and execute handovers when a MS moves or requires a different quality of service.

Further, since the paging requests, paging responses and measurement reports are exchanged using additional wire lines and Wi-Fi connections, there may be less traffic through one or more long-range RATs allowing the network to accommodate more MSs.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a multi-mode mobile station that supports communications with a plurality of radio access technologies (RATs) including at least one short range RAT and at least one long range RAT, comprising:
    establishing a first connection with a first network via a short range RAT supported by the mobile station;
    receiving, via the first connection, a paging message comprising paging information for a plurality of long range RATs;
    taking signal quality measurements for one or more long range RATs supported by the mobile station; and
    transmitting the signal quality measurements via the first connection of the short range RAT;
    the paging message indicating that a paging request for the mobile station is detected on a second network that supports at least one of the one or more long range RATs supported by the mobile station.

2. The method of claim 1, further comprising responding to the paging message via the first connection.

3. The method of claim 1, wherein the signal quality measurements are transmitted in response to a measurement request sent from the second network via the first connection.

4. The method of claim 1, wherein:
    the short range RAT comprises a radio access technology in accordance with IEEE 802.11 family of standards; and
    establishing a first connection with a first network via a short range RAT supported by the mobile station comprises establishing an internet protocol (IP) connection via the short range RAT.

5. A method for wireless communications, comprising:
    receiving a list of multiple radio access technologies (RATs) supported by a mobile station;
    establishing a first connection with the mobile station via a short range RAT supported by the mobile station;
    sending, via the first connection, a paging message comprising paging information for a plurality of long range RATs; and
    receiving, via the first connection, signal quality measurements for one or more long range RATs supported by the mobile station;
    the paging message indicating that a paging request for the mobile station is detected on a network that supports at least one of the one or more long range RATs supported by the mobile station.

6. The method of claim 5, wherein:
    the first RAT comprises a short range RAT in accordance with IEEE 802.11 family of standards.

7. The method of claim 6, wherein at least one of the RATs supported by the mobile station comprises a code division multiple access (CDMA) RAT.

8. The method of claim 5, wherein at least one of the RATs supported by the mobile station comprises a RAT in accordance with one or more standards of the Institute of Electrical and Electronics Engineers (IEEE) 802.16 family of standards.

9. An apparatus for wireless communications by a multi-mode mobile station that supports communications with a plurality of radio access technologies (RATs) including at least one short range RAT and at least one long range RAT, comprising:
    a processor;
    memory in electronic communication with the processor; and
    instructions stored in the memory, the instructions being executable by the processor to:
        establish a first connection with a first network via a short range RAT supported by the mobile station;
        receive, via the first connection, a paging message comprising paging information for a plurality of long range RATs;
        take signal quality measurements for one or more long range RATs supported by the mobile station; and
        transmit the signal quality measurements via the first connection of the short range RAT;
        the paging message indicating that a paging request for the mobile station is detected on a second network that supports at least one of the one or more long range RATs supported by the mobile station.

10. The apparatus of claim 9, further comprising instructions executable by the processor to respond to the paging message via the first connection.

11. The apparatus of claim 9, wherein the signal quality measurements are transmitted in response to a measurement request sent from the second network via the first connection.

12. The apparatus of claim 9, wherein:
the short range RAT comprises a radio access technology in accordance with IEEE 802.11 family of standards; and
the instructions to establish a first connection with a first network via a short range RAT supported by the mobile station comprise instructions executable by the processor to establish an internet protocol (IP) connection via the short range RAT.

13. An apparatus for wireless communications, comprising:
a processor;
memory in electronic communication with the processor; and
instructions stored in the memory, the instructions being executable by the processor to:
receive a list of multiple radio access technologies (RATs) supported by a mobile station;
establish a first connection with the mobile station via a short range RAT supported by the mobile station;
send, via the first connection, a paging message comprising paging information for a plurality of long range RATs; and
receive, via the first connection, signal quality measurements for one or more long range RATs supported by the mobile station;
the paging message indicating that a paging request for the mobile station is detected on a network that supports at least one of the one or more long range RATs supported by the mobile station.

14. The apparatus of claim 13, wherein:
the first RAT comprises a short range RAT in accordance with IEEE 802.11 family of standards.

15. The apparatus of claim 14, wherein at least one of the RATs supported by the mobile station comprises a code division multiple access (CDMA) RAT.

16. The apparatus of claim 13, wherein at least one of the RATs supported by the mobile station comprises a RAT in accordance with one or more standards of the Institute of Electrical and Electronics Engineers (IEEE) 802.16 family of standards.

17. An apparatus for wireless communications by a multi-mode mobile station that supports communications with a plurality of radio access technologies (RATs) including at least one short range RAT and at least one long range RAT, comprising:
means for establishing a first connection with a first network via a short range RAT supported by the mobile station;
means for receiving, via the first connection, a paging message comprising paging information for a plurality of long range RATs;
means for taking signal quality measurements for one or more long range RATs supported by the mobile station; and
means for transmitting the signal quality measurements via the first connection of the short range RAT;
the paging message indicating that a paging request for the mobile station is detected on a second network that supports at least one of the one or more long range RATs supported by the mobile station.

18. The apparatus of claim 17, further comprising means for responding to the paging message via the first connection.

19. The apparatus of claim 17, wherein the signal quality measurements are transmitted in response to a measurement request sent from the second network via the first connection.

20. The apparatus of claim 17, wherein:
the short range RAT comprises a radio access technology in accordance with IEEE 802.11 family of standards; and
the means for establishing a first connection with a first network via a short range RAT supported by the mobile station comprise means for establishing an internet protocol (IP) connection via the short range RAT.

21. An apparatus for wireless communications, comprising:
means for receiving a list of multiple radio access technologies (RATs) supported by a mobile station;
means for establishing a first connection with the mobile station via a short range RAT supported by the mobile station;
means for sending, via the first connection, a paging message comprising paging information for a plurality of long range RATs; and
means for receiving, via the first connection, signal quality measurements for one or more long range RATs supported by the mobile station;
the paging message indicating that a paging request for the mobile station is detected on a network that supports at least one of the one or more long range RATs supported by the mobile station.

22. The apparatus of claim 21, wherein:
the first RAT comprises a short range RAT in accordance with IEEE 802.11 family of standards.

23. The apparatus of claim 22, wherein at least one of the RATs supported by the mobile station comprises a code division multiple access (CDMA) RAT.

24. The apparatus of claim 21, wherein at least one of the RATs supported by the mobile station comprises a RAT in accordance with one or more standards of the Institute of Electrical and Electronics Engineers (IEEE) 802.16 family of standards.

25. A non-transitory computer readable medium having a computer readable program code, the computer readable program code including instructions being executable by one or more processors and the instructions comprising:
instructions for establishing a first connection with a first network via a short range RAT supported by the mobile station;
instruction for receiving, via the first connection, a paging message comprising paging information for a plurality of long range RATs;
instructions for taking signal quality measurements for one or more long range RATs supported by the mobile station;
instructions for transmitting the signal quality measurements via the first connection of the short range RAT;
the paging message indicating that a paging request for the mobile station is detected on a second network that supports at least one of the one or more long range RATs supported by the mobile station.

26. The non-transitory computer readable medium of claim 25, wherein the instructions further comprise instructions for responding to the paging message via the first connection.

27. The non-transitory computer readable medium of claim 25, wherein the signal quality measurements are transmitted in response to a measurement request sent from the second network via the first connection.

28. The non-transitory computer readable medium of claim 25, wherein:

the short range RAT comprises a radio access technology in accordance with IEEE 802.11 family of standards; and the instructions for establishing a first connection with a first network via a short range RAT supported by the mobile station comprise instructions for establishing an internet protocol (IP) connection via the short range RAT.

29. A non-transitory computer readable medium having a computer readable program code, the computer readable program code including instructions being executable by one or more processors and the instructions comprising:

instructions for receiving a list of multiple radio access technologies (RATs) supported by a mobile station;

instructions for establishing a first connection with the mobile station via a short range RAT supported by the mobile station;

instructions for sending, via the first connection, a paging message comprising paging information for a plurality of long range RATs; and instructions for receiving, via the first connection, signal quality measurements for a one or more long range RATs supported by the mobile station;

the paging message indicating that a paging request for the mobile station is detected on a network that supports at least one of the one or more long range RATs supported by the mobile station.

30. The non-transitory computer readable medium of claim 29, wherein:

the first RAT comprises a short range RAT in accordance with IEEE 802.11 family of standards.

31. The non-transitory computer readable medium of claim 30, wherein at least one of the RATs supported by the mobile station comprises a code division multiple access (CDMA) RAT.

32. The non-transitory computer readable medium of claim 29, wherein at least one of the RATs supported by the mobile station comprises a RAT in accordance with one or more standards of the Institute of Electrical and Electronics Engineers (IEEE) 802.16 family of standards.

* * * * *